(12) United States Patent
Choi et al.

(10) Patent No.: US 7,895,704 B2
(45) Date of Patent: Mar. 1, 2011

(54) APPARATUS OF CLEANING RUBBING-CLOTH

(75) Inventors: Byoung Chul Choi, Paju-si (KR); Chang Soo Na, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 1097 days.

(21) Appl. No.: 11/646,239

(22) Filed: Dec. 28, 2006

(65) Prior Publication Data

US 2007/0289608 A1    Dec. 20, 2007

(30) Foreign Application Priority Data

Jun. 20, 2006    (KR) .................. 10-2006-0055221

(51) Int. Cl.
*A47L 5/14*    (2006.01)
(52) U.S. Cl. ............... 15/303; 15/308; 15/312.1; 15/345
(58) Field of Classification Search ............ 15/320–322, 15/303, 308, 318, 312.1, 345, 368, 416, 372; A47L 5/14
See application file for complete search history.

(56) References Cited

U.S. PATENT DOCUMENTS 5,361,453 A * 11/1994 Gerber .......................... 15/308
5,412,836 A *  5/1995 Kuchta .......................... 15/308

* cited by examiner

*Primary Examiner* — David A Redding
(74) *Attorney, Agent, or Firm* — McKenna Long & Aldridge LLP

(57) ABSTRACT

Provided is an apparatus for cleaning a rubbing-cloth. The apparatus includes a rubbing-cloth fixing unit, a pile removing head, and a transferring unit. The rubbing-cloth fixing unit is fixed to a base body and fixes a rubbing-cloth that is substantially unfolded. The pile removing head is disposed on the rubbing-cloth fixing unit and sucks and removes the piles attached onto the rubbing-cloth. The transferring unit is fixed to the base body and transfers the pile removing head along an upper surface of the rubbing-cloth with respect to the rubbing-cloth fixing unit. Accordingly, particles that are generated when a rubbing-cloth is cut out from a fabric are quickly removed from the rubbing-cloth, so that scratches may be prevented from being generated on an alignment film.

12 Claims, 7 Drawing Sheets

APPARATUS OF CLEANING RUBBING-CLOTH

This application claims the benefit of Korean Patent Application No. P2006-055221, filed on Jun. 20, 2006, which is hereby incorporated by reference for all purposes as if fully set forth herein.

BACKGROUND OF THE INVENTION

1. Field of the Invention

The present invention relates to a rubbing-cloth cleaning apparatus capable of efficiently removing piles from a rubbing-cloth used to rub an alignment film.

2. Discussion of the Related Art

An information processing device that can quickly process a great amount of data, and a display apparatus that displays the data processed by the information processing device to create an image are rapidly being developed.

A liquid crystal display (LCD) device, which is a representative display device, includes liquid crystal molecules. The liquid crystal molecules change their orientations in response to an electric field. The changing molecular arrangements result in optical characteristics such as variable light transmittance indices.

The LCD device may include a thin film transistor (TFT) substrate, a color filter substrate, and a liquid crystal (LC) layer. The LC layer includes liquid crystal molecules.

The thin film transistor substrate and the color filter substrate of the LCD device may include an alignment film for aligning the liquid crystal molecules in a predetermined direction.

Alignment of the liquid crystal molecules in the predetermined direction may be carried out by a rubbing process. The rubbing process may include an attachment process for attaching a rubbing-cloth having piles onto a surface of a rubbing roller, and a contacting process for contacting the rubbing-cloth to the surface of the alignment film to align polymer chains of the alignment film in the predetermined direction.

However, when the rubbing-cloth is cut out from a fabric, piles of the rubbing-cloth are undesirably cut off together from the fabric so that a quantity of particles is disposed on the rubbing-cloth. The particles disposed on the rubbing-cloth may cause undesirable scratches on the alignment film.

In order to prevent such undesired scratching of the alignment film caused by the particles disposed on the rubbing-cloth, the particles are removed from the rubbing-cloth.

However, since the particles are very small in size, it is difficult to completely remove such piles from the rubbing-cloth, and it takes a long time to remove the piles from the rubbing-cloth.

SUMMARY OF THE INVENTION

Accordingly, the present invention is directed to an apparatus of cleaning a rubbing-cloth that substantially obviates one or more problems due to limitations and disadvantages of the related art.

An advantage of the present invention is to provide an apparatus of cleaning a rubbing-cloth that facilitates removal of particles attached on the rubbing-cloth and reduces the time it takes to remove the piles from the rubbing-cloth.

Additional features and advantages of the present invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the invention, as embodied and broadly described herein, there is provided an apparatus for removing particles from a rubbing-cloth for rubbing an alignment film comprising a rubbing-cloth fixing unit fixed to a base body and fixing the rubbing-cloth; a pile removing head disposed substantially above the rubbing-cloth fixing unit, the pile removing head sucking the particles disposed on the rubbing-cloth to remove the particles from the rubbing-cloth; and a transferring unit installed with the base body, the transferring unit transferring the pile removing head along an upper surface of the rubbing-cloth.

According to the present invention, piles that are undesirably cut off while a rubbing-cloth is cut out from a fabric are quickly removed from the rubbing-cloth, so that generation or scratches may be prevented from occurring on an alignment film.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts. It will be understood that when a rubbing-cloth fixing unit, a pile removing head, a transferring unit, and other structures are referred to as being "on" or "under" another structure, they can be directly on or under the another structure, or intervening structures may also be present.

Figure 1:
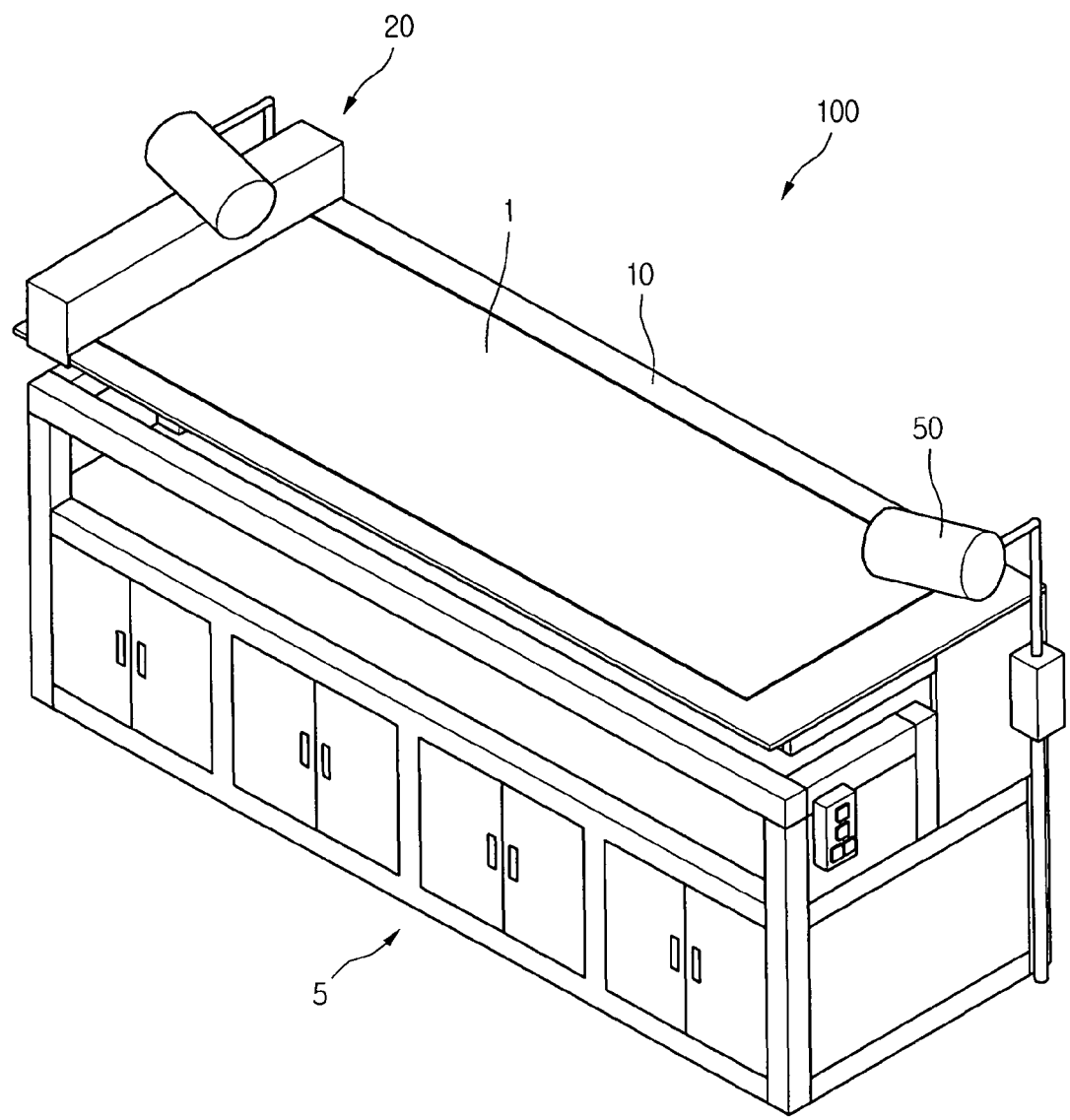
FIG. 1 is a perspective view illustrating an apparatus of cleaning a rubbing-cloth in accordance with one embodiment of the present invention.
Figure 2:
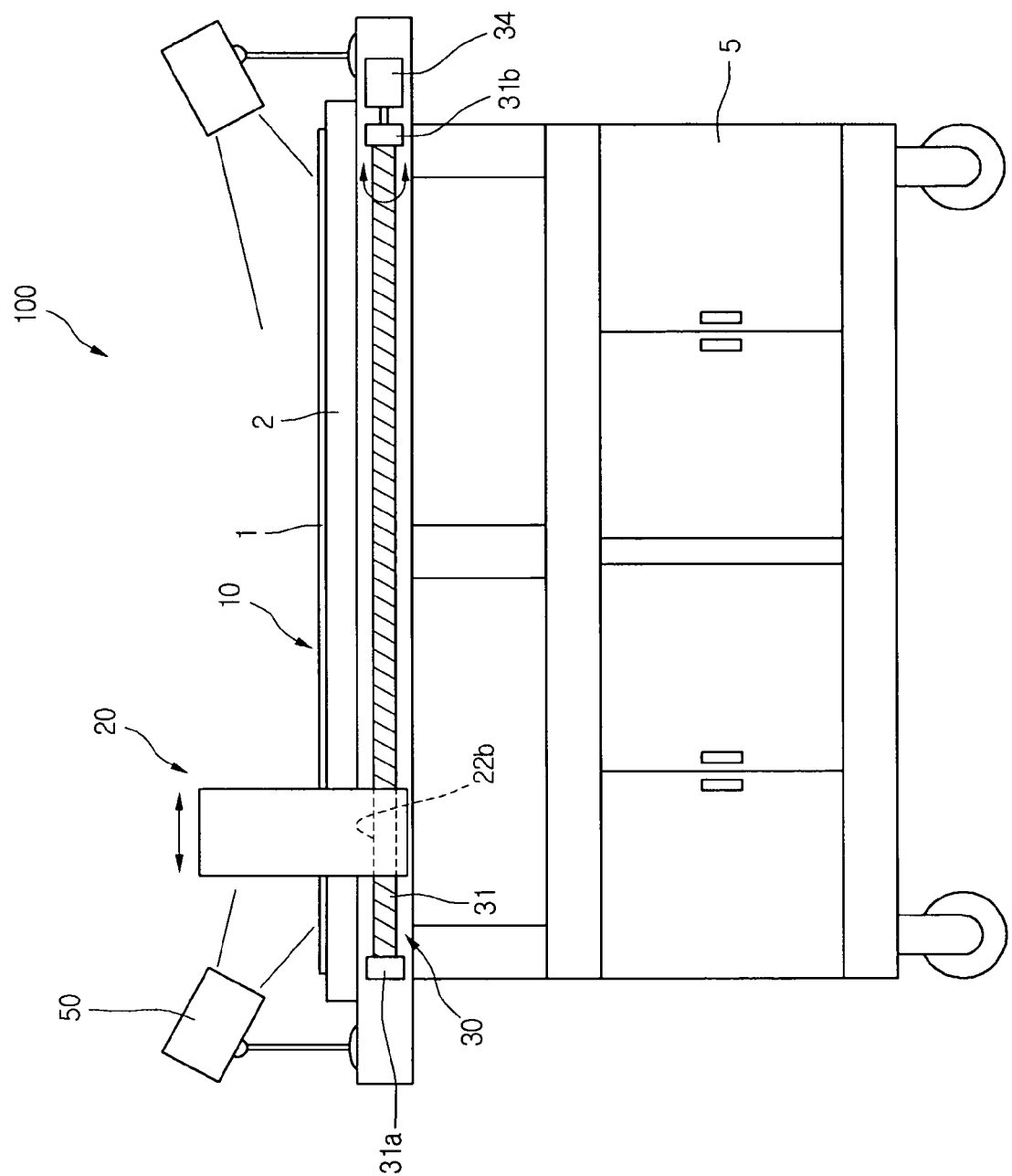
FIG. 2 is a side view illustrating the apparatus of cleaning the rubbing-cloth in FIG. 1.

FIG. 1 is a perspective view illustrating a rubbing-cloth cleaning apparatus in accordance with one embodiment of the present invention. FIG. 2 is a side view illustrating the rubbing-cloth cleaning apparatus in FIG. 1.

Referring to FIGS. 1 and 2, a rubbing-cloth cleaning apparatus 100 may include a base body 5, a rubbing-cloth fixing unit 10, a pile removing head 20, and a transferring unit 30, for example.

The base body 5 serves as a supporter for supporting the rubbing-cloth fixing unit 10, the pile removing head 20, and the transferring unit 30. The base body 5 may have, for example, a substantially rectangular parallelepiped shape.

Figure 3:
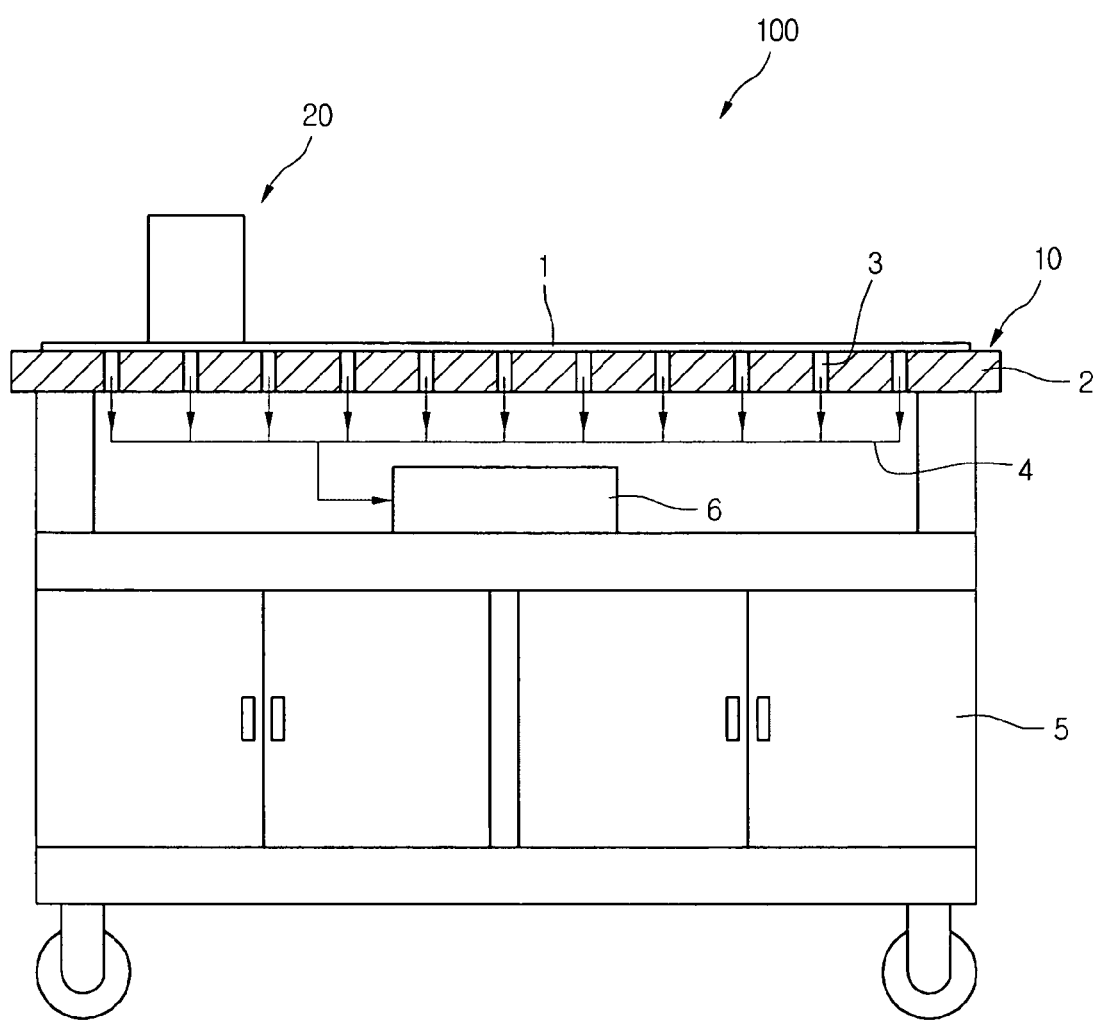
FIG. 3 is a cross-sectional view illustrating the rubbing-cloth fixing unit in FIG. 2.

FIG. 3 is a cross-sectional view illustrating the rubbing-cloth fixing unit in FIG. 2.

Referring to FIGS. 2 and 3, the rubbing-cloth fixing unit 10 is installed on the base body 5. The rubbing-cloth is substantially unfolded and fixed onto the rubbing-cloth unit 10.

To fix the rubbing-cloth on the rubbing-cloth fixing unit 10, the rubbing-cloth fixing unit 10 may include an adsorption table 2, a vacuum tube 4 and a vacuum generator 6, for example.

The adsorption table 2 has a substantially flat plate shape to support the rubbing-cloth 1, and the rubbing-cloth 1 is disposed on the adsorption table 2. The adsorption table 2 may include a through hole 3 that penetrates an upper face thereof contacting the rubbing-cloth 1 and a lower face thereof opposite to the upper surface. In the present embodiment, a plurality of through holes 3 are substantially uniformly arranged in the adsorption table 2.

The vacuum tube 4 may be connected to the through holes 3 formed in the adsorption table 2. In this embodiment, a plurality of first ends of the vacuum tube 4 correspond to inlets of each of the through holes 3 formed on the lower face of the adsorption table 2. A second end in communication with the first end of the vacuum tube 4 may be connected to the vacuum generator 6.

When pressure lower than atmospheric pressure is generated by the vacuum generator 6, the internal pressure of the vacuum tube 4 and the through holes 3 becomes lower than the atmospheric pressure so that the rubbing-cloth 1 disposed on the adsorption table 2 is attached on the adsorption table 2 by the internal pressure of the through holes 3.

Although the rubbing-cloth 1 is adsorbed on the adsorption table 2 using lower pressure than atmospheric pressure in the present embodiment, alternatively, the rubbing-cloth 1 may be attached onto the adsorption table 2 by static electricity. Alternatively, the rubbing-cloth 1 may be fixed as both ends thereof are held and pulled by clamps.

Figure 4:
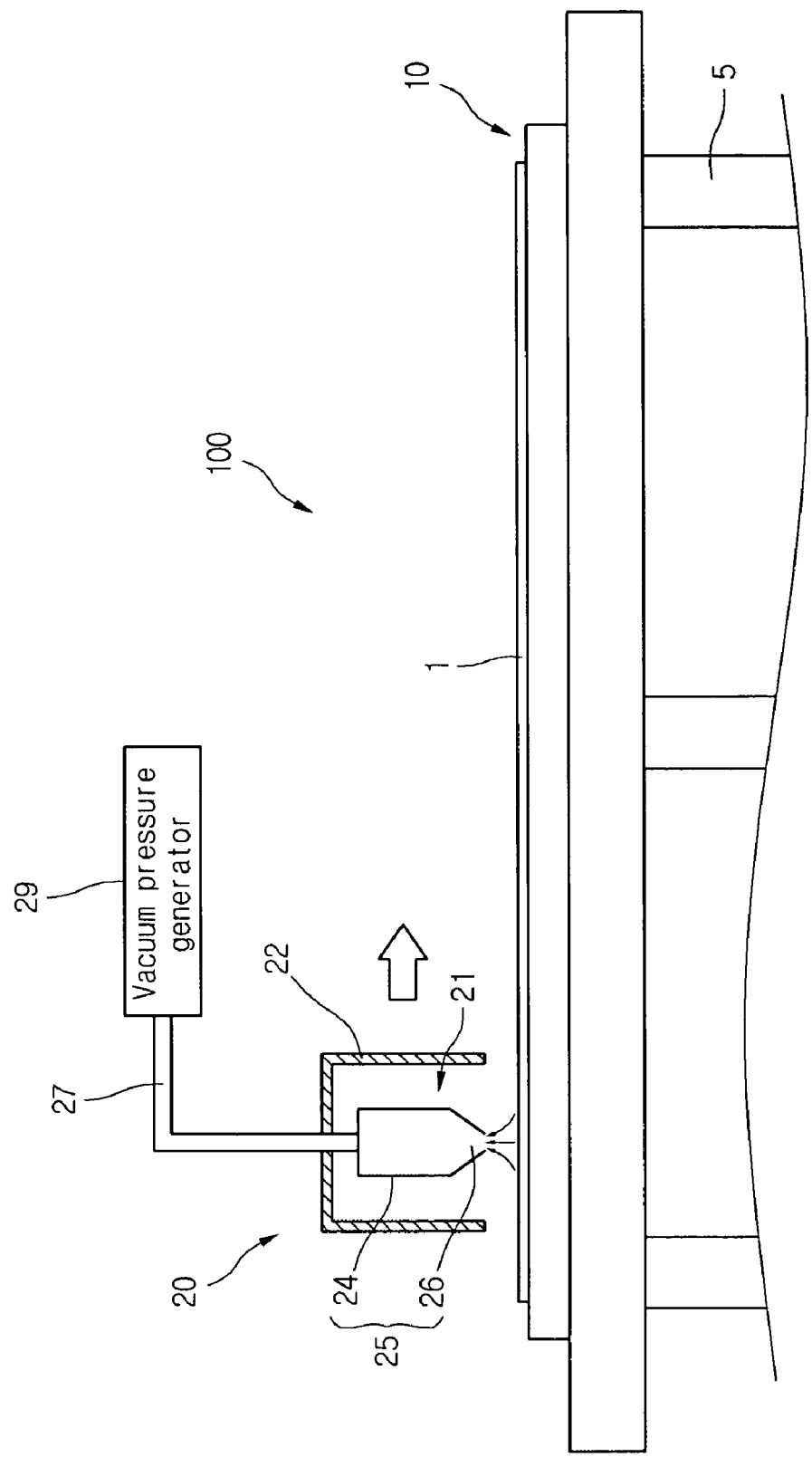
FIG. 4 is a cross-sectional view illustrating one example of the pile removing head in FIG. 2.

FIG. 4 is a cross-sectional view illustrating one example of the pile removing head in FIG. 2.

The pile removing head 20 removes cut-off piles that are attached onto a surface of the rubbing-cloth 1 fixed by the rubbing-cloth fixing unit 10 from the rubbing-cloth 1. Hereinafter, the cut-off piles are referred to as "particles".

To remove the particles from the rubbing-cloth 1, the pile removing head 20 may include a pile suction head 21. The pile suction head 21 may include a suction body 22, a pile suction unit 25, and a vacuum pressure generator 29.

The suction body 22 of the pile suction head 21 may have a substantially rectangular parallelepiped shape having an opening that faces the rubbing-cloth 1. A longitudinal direction of the suction body 22 is substantially parallel to a width direction of the rubbing-cloth 1, and the width of the suction body 22 may be at least substantially equal to or substantially wider than that of the rubbing-cloth 1.

The pile suction unit 25 may be disposed within the suction body 22. In this embodiment, the pile suction unit 25 may include a suction body 24 having an air inlet 26 for sucking particles disposed on the rubbing-cloth 1. In the present embodiment, the air inlet 26 faces the rubbing-cloth 1, and has a substantially slit shape when viewed on a plane. In the present embodiment, when the air inlet 26, for example, has the slit shape, particles attached onto the rubbing-cloth 1 may be efficiently sucked therein. Although the air inlet 26 may be formed as the slit shape in the present embodiment, the air inlet 26 may have various shapes. For example, the air inlet 26 may have a circular shape, an oval shape, or a quadrangular shape.

The vacuum pressure generator 29 may include a vacuum generating unit, and communicates with the suction body 24 of the pile suction unit 25 using a vacuum tube 27.

In the present invention, the pile removing head 20 may further include a height adjusting unit. The height adjusting unit finely adjusts an interval between the air inlet 26 of the pile suction unit 25 and the rubbing-cloth 1.

When the interval between the air inlet 26 of the pile suction unit 25 and the rubbing-cloth 1 is precisely adjusted by the height adjusting unit, the particles attached on the rubbing-cloth 1 may be more effectively removed.

Figure 5:
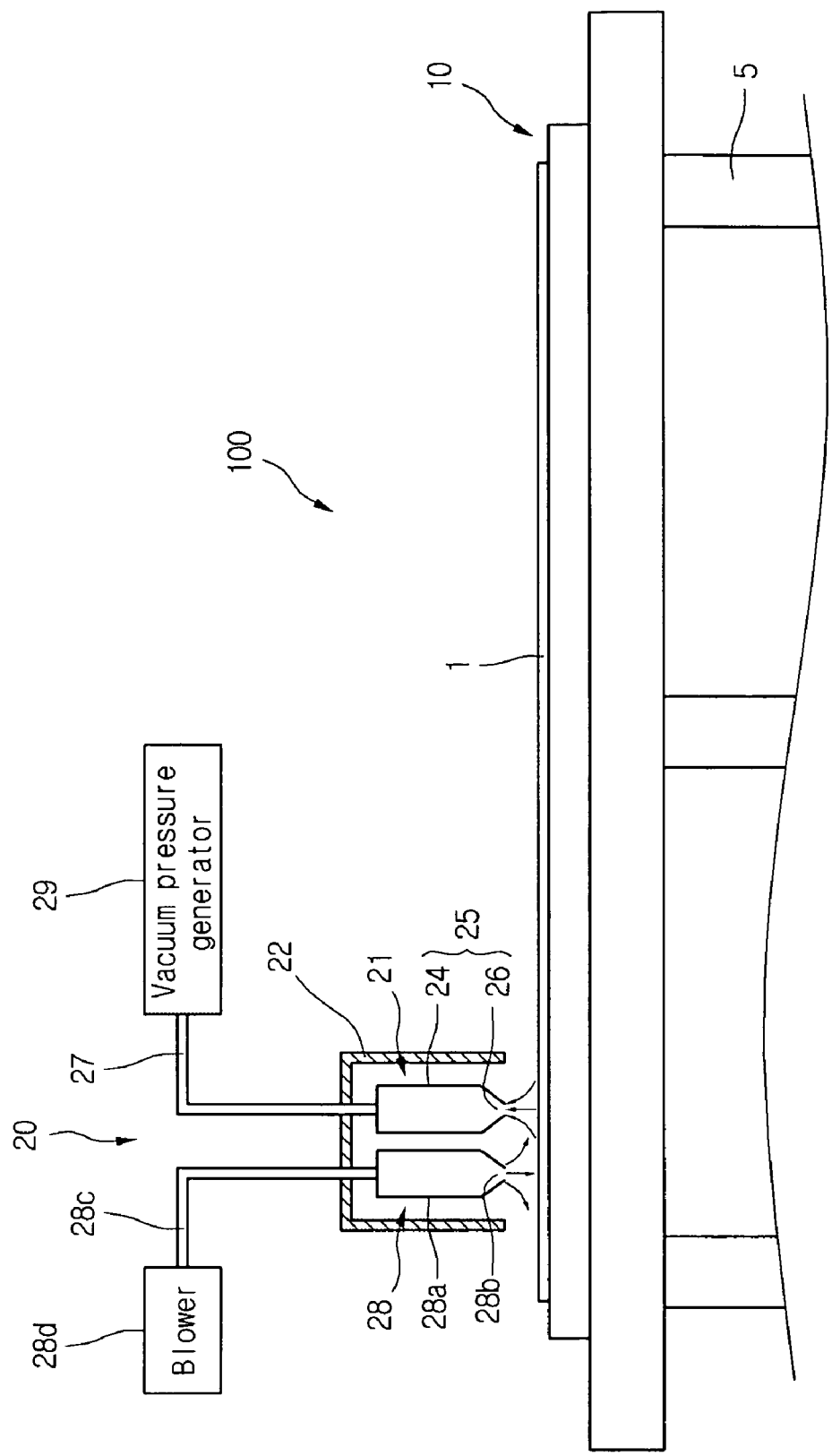
FIG. 5 is a cross-sectional view illustrating another example of the pile removing head in FIG. 2.

FIG. 5 is a cross-sectional view illustrating another example of the pile removing head in FIG. 2.

The pile removing head 20 removes the particles that are attached on a surface of the rubbing-cloth 1 fixed onto the adsorption table 2 by the rubbing-cloth fixing unit 10 from the rubbing-cloth 1.

To remove the particles from the rubbing-cloth 1, the pile removing head 20 a suction body 22, a pile suction head 21, and a pile floating device 28.

The suction body 22 may have a substantially rectangular parallelepiped box shape having an opening that substantially faces the rubbing-cloth 1. The width of the suction body 22 may be at least substantially equal to or substantially greater than the width of the rubbing-cloth 1.

The pile suction head 21 may include a pile suction unit 25, and a vacuum pressure generator 29.

The pile suction unit 25 is disposed within the suction body 22. In the present embodiment, the pile suction unit 25 includes a suction body 24 having an air inlet 26 for sucking particles disposed on the rubbing-cloth 1. In the present embodiment, the air inlet 26 formed at a portion of the suction body 24 faces the rubbing-cloth 1. The air inlet 26 has, for example, a substantially slit shape.

In this embodiment, since the air inlet 26 has the substantially slit shape, fine particles may be efficiently sucked through the air inlet 26. Although the air inlet 26 has, for example, the substantially slit shape in the present embodiment, the air inlet 26 may have various shapes.

The vacuum pressure generator 29 may include a vacuum generating unit, and communicates with the suction body 24 of the pile suction unit 25 using a vacuum tube 27.

In the present embodiment, the pile removing head 20 may further include a height adjusting unit (not shown) to finely adjust an interval between the air inlet 26 of the pile suction unit 25 and the rubbing-cloth 1. When the interval between the air inlet 26 of the pile suction unit 25 and the rubbing-cloth 1 is precisely adjusted using the height adjusting unit, the particles attached to the rubbing-cloth 1 may be more efficiently removed.

The pile floating device 28 may further include a floating body 28a, an air spraying outlet 28b, a connecting pipe 28c, and a blower 28d.

The floating body 28a is disposed in the suction body 22, and the air spraying outlet 28b is formed at an end portion of the floating body 28a. The air spraying outlet 28b may have a substantially slit shape. As the air spraying outlet 28b is formed as a substantially slit shape in the present embodiment, the air may be efficiently sprayed onto the rubbing-cloth 1 at a high speed to float the particles from the rubbing-cloth 1. The blower 28d communicates with the floating body 28a using the connecting pipe 28c.

In the present embodiment, the particles disposed on the rubbing-cloth 1 are floated above the rubbing-cloth 1 by the air sprayed by the pile floating device 28. The floated piles are sucked by the pile suction head 21 disposed adjacent to the pile floating device 28. Therefore, the piles may be efficiently removed from the rubbing-cloth 1.

Figure 6:
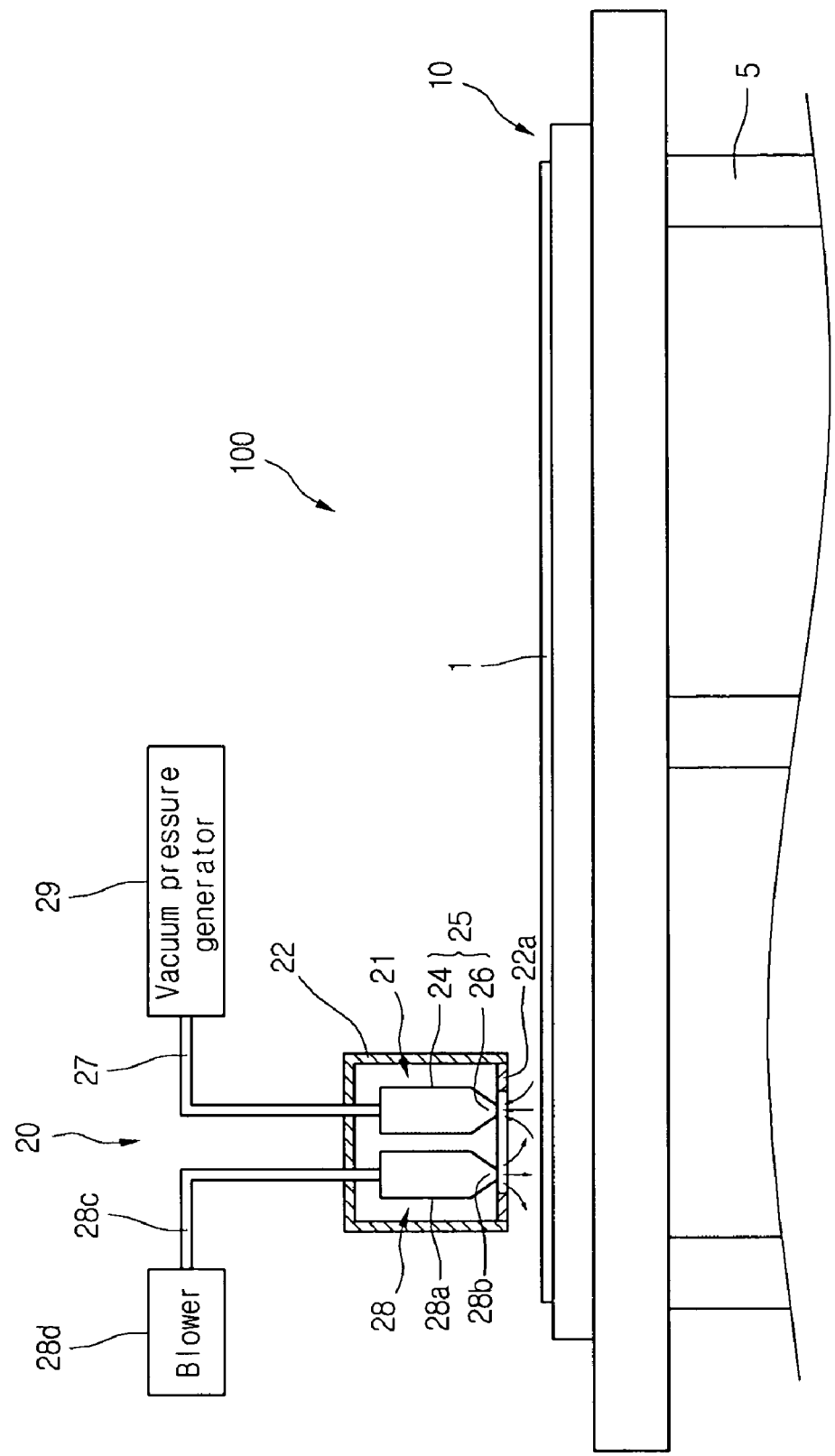
FIG. 6 is a cross-sectional view illustrating still another example of the pile removing head in accordance with an embodiment of the present invention.

FIG. 6 is a cross-sectional view illustrating another example of the pile removing head according to one embodiment of the present invention.

Referring to FIG. 6, a suction-force enhancing member 22a is disposed at the body 22 of the pile removing head 20. The suction-force enhancing member 22a increases a suction force of the air inlet 26 of the pile suction unit 25. Thus, particles disposed on the rubbing-cloth 1 may be more efficiently sucked. The suction-force enhancing member 22a may be disposed at the opening of the suction body 22. The suction-force enhancing member 22a has a substantially plate shape, and has an opening. The opening of the suction-force enhancing member 22a substantially corresponds to positions of the pile suction head 21 and the pile floating device 28.

Meanwhile, the above-mentioned pile removing head 20 is transferred along an upper surface of the rubbing-cloth fixing unit 10 to remove particles disposed on the rubbing-cloth 1.

The pile removing head 20 is transferred along the rubbing-cloth fixing unit 10 by a transferring unit 30 to be described later to remove the particles attached to the rubbing-cloth 1 disposed on the rubbing-cloth fixing unit 10.

Referring to FIG. 2 again, the transferring unit 30 may include a screw bar 31, and a rotator 34 rotating the screw bar 31.

The screw bar 31 is installed, for example, at a side face of the rubbing-cloth fixing unit 10, and both ends of the screw bar 31 are fixed thereto by pivots 31a and 31b installed at the side face of the rubbing-cloth fixing unit 10. The screw bar 31 may be rotated and supported by the pivots 31a and 31b.

To transfer the pile removing head 20, a portion of the pile removing head 20 extends toward the screw bar 31. The extending portion of the pile removing head 20 may have a coupling hole 22b to combine the screw bar 31 with the coupling hole 22b.

The rotator 34 may be combined with an end of the screw bar 31. In particular, the rotator 34 has a rotator shaft, and the rotator shaft is connected to the end of the screw bar 31. The screw bar 31 is rotated forward or backward corresponding to a forward or backward rotation of the rotator 34. Thus, the pile removing head 20 is moved along the screw bar 31.

Figure 7:
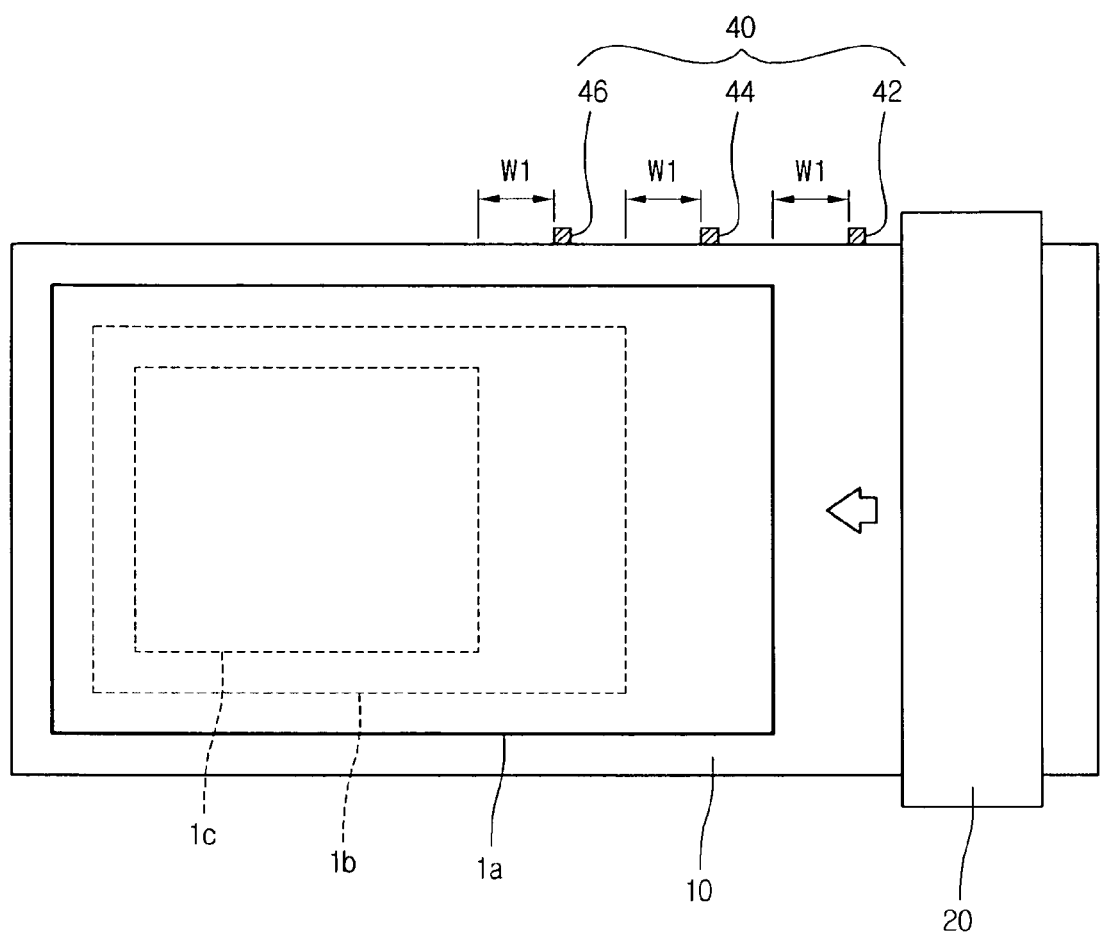
FIG. 7 is a plan view illustrating a sensor for controlling an operation of the pile control head corresponding to a size of a rubbing-cloth in FIG. 2.

FIG. 7 is a plan view illustrating a sensor for controlling an operation of the pile removing head corresponding to a size of the rubbing-cloth in FIG. 2.

Referring to FIG. 7, a first rubbing-cloth 1a having a first size, a second rubbing-cloth 1b having a second size substantially smaller than the first size, and a third rubbing-cloth 1c having a third size substantially smaller than the second size may be disposed on the rubbing-cloth fixing unit 10.

To operate the pile removing head 20 in response to the different sizes of the first to third rubbing-cloths 1a, 1b and 1c, a first sensor 42 sensing the pile removing head 20 is disposed at a position of the rubbing-cloth fixing unit 10 which is spaced apart from an end of the first rubbing-cloth 1a at a predetermined interval (W1).

A second sensor 44 sensing the pile removing head 20 is disposed at a position of the rubbing-cloth fixing unit 10 which is spaced apart from an end of the second rubbing-cloth 1b at a predetermined interval (W1).

A third sensor 46 sensing the pile removing head 20 is disposed at a position of the rubbing-cloth fixing unit 10 which is spaced apart from an end of the third rubbing-cloth 1c at a predetermined interval (W1).

The first to third sensors 42, 44 and 46 may be a proximity sensor sensing the proximity of the pile removing head 20. Alternatively, a sensor moving along the rubbing-cloth fixing unit 10 in response to size changes of the rubbing-cloth 1 may be installed at the rubbing-cloth fixing unit 10.

Referring to FIG. 2 again, while transferred along the rubbing-cloth 1 by the transferring unit 30, the pile removing head 20 removes particles from the rubbing-cloth 1. Then, in order to manually remove piles that may possibly still remain on the rubbing-cloth 1, a lighting unit 50 that emits light, for example, green light, may be disposed above the rubbing-cloth fixing unit 10. In the present embodiment, a plurality of light units 50 are disposed at both ends of the rubbing-cloth 1, and may use sodium lamps.

As described above, according to the present invention, particles undesirably generated when a rubbing-cloth is cut out from a fabric for a rubbing-cloth may be quickly removed from the rubbing-cloth, so that scratches are prevented from being generated on an alignment film.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An apparatus for removing particles from a rubbing-cloth for rubbing an alignment film, the apparatus comprising:
   a rubbing-cloth fixing unit fixed to a base body and fixing the rubbing-cloth;
   a pile removing head disposed substantially above the rubbing-cloth fixing unit, the pile removing head sucking particles disposed on the rubbing-cloth to remove the particles from the rubbing-cloth; and
   a transferring unit installed with the base body, the transferring unit transferring the pile removing head along an upper surface of the rubbing-cloth,
   wherein the pile removing head includes a pile floating unit,
   wherein the pile floating unit includes:
   an air-spraying unit spraying air to the rubbing-cloth to float the piles from the rubbing-cloth; and
   an air providing unit providing air to the air spraying unit.

2. The apparatus of claim 1, wherein the rubbing-cloth fixing unit includes:
   an adsorption table having a plurality of through holes for adsorbing the rubbing-cloth;
   a vacuum tube connected to the through holes; and
   a vacuum generator connected to the vacuum tube and generating a substantially lower pressure than atmospheric pressure within the through holes.

3. The apparatus of claim 1, wherein the air spraying unit has a substantially slit shape.

4. The apparatus of claim 1, wherein the transferring unit includes:
   a screw bar installed at the rubbing-cloth fixing unit and screw-coupled to a part of the pile removing head; and
   a rotator rotating the screw bar to drive the pile removing head.

5. The apparatus of claim 4, wherein the rotator is a forward/backward motor that rotates the screw bar forward/backward.

6. The apparatus of claim 1, wherein the rubbing-cloth fixing unit comprises at least one sensor disposed on a portion corresponding to an end of the rubbing-cloth to set an operating position of the pile removing head depending on a size of the rubbing-cloth.

7. The apparatus of claim 6, wherein the sensor is a proximity sensor that is operated when the pile removing head approaches within a predetermined range.

8. The apparatus of claim 1, further comprising a lighting unit emitting light to the rubbing-cloth to help locate piles remaining on the rubbing-cloth.

9. The apparatus of claim 8, wherein the lighting unit is a sodium lamp.

10. The apparatus according to claim 1, wherein the pile removing head comprises a height adjusting unit adjusting an interval between the pile removing head and the rubbing-cloth.

11. An apparatus for removing particles from a rubbing-cloth for rubbing an alignment film, the apparatus comprising:

a rubbing-cloth fixing unit fixed to a base body and fixing the rubbing-cloth;

a pile removing head disposed substantially above the rubbing-cloth fixing unit, the pile removing head sucking particles disposed on the rubbing-cloth to remove the particles from the rubbing-cloth; and a transferring unit installed with the base body, the transferring unit transferring the pile removing head along an upper surface of the rubbing-cloth, wherein the pile removing head includes:

an air spraying unit spraying the air to the rubbing-cloth to float the piles from the rubbing-cloth, and an air providing unit providing air to the air spraying unit; and a pile removing unit including a body having an opening that faces the rubbing-cloth, a suction unit mounted within the body to suck the floated piles through the opening, and a vacuum pressure generator connected to the suction unit.

12. The apparatus of claim 11, wherein the pile removing head comprises a suction-force enhancing member that reduces an area of the opening.

* * * * *